(12) United States Patent
Fraysse et al.

(10) Patent No.: US 9,791,070 B2
(45) Date of Patent: Oct. 17, 2017

(54) DEVICE AND METHOD FOR FITTING TWO CONNECTIONS AT THE END OF TWO CONDUITS, IN PARTICULAR IN AN AIRCRAFT

(71) Applicant: Airbus Operations (S.A.S.), Toulouse (FR)

(72) Inventors: Damien Fraysse, Toulouse (FR); Thierry Gagnaire, Saint Lys (FR); Benoît Thomas, Ramonville (FR)

(73) Assignee: Airbus Operations (S.A.S.), Toulouse (FR)

( * ) Notice: Subject to any disclaimer, the term of this patent is extended or adjusted under 35 U.S.C. 154(b) by 373 days.

(21) Appl. No.: 14/557,087

(22) Filed: Dec. 1, 2014

(65) Prior Publication Data

US 2015/0152977 A1    Jun. 4, 2015

Related U.S. Application Data

(63) Continuation of application No. PCT/FR2013/051234, filed on May 31, 2013.

(30) Foreign Application Priority Data

Jun. 1, 2012    (FR) ...................................... 12 55079

(51) Int. Cl.
*F16L 1/10* (2006.01)
*B25B 27/16* (2006.01)
*B64D 37/00* (2006.01)

(52) U.S. Cl.
CPC ................ *F16L 1/10* (2013.01); *B25B 27/16* (2013.01); *B64D 37/00* (2013.01)

(58) Field of Classification Search
CPC ......................................................... F16L 1/10
(Continued)

(56) References Cited

U.S. PATENT DOCUMENTS

| 2,960,308 | A | 11/1960 | O'Donnell |
| 3,104,493 | A | 9/1963 | Nalle |

(Continued)

FOREIGN PATENT DOCUMENTS

| CA | 1 050 003 | 3/1979 | |
| CA | 2816196 A1 * | 11/2014 | ................ F16L 1/09 |

(Continued)

OTHER PUBLICATIONS

International Search Report for Application No. PCT/FR2013/051234 dated Dec. 20, 2013.
(Continued)

*Primary Examiner* — Christopher Fulton
(74) *Attorney, Agent, or Firm* — Jenkins, Wilson, Taylor & Hunt, P.A.

(57) ABSTRACT

Device for fitting two connectors at the end of two conduits, particularly in an aircraft, with a view to subsequent mutual connection of the connectors by a connecting pipe, including a body; a first support including temporary connector retainers that define an associated connector axis; an opposite second support including temporary connector retainers that define an associated connector axis; structure for moving the first support in translation relative to the body parallel to the associated connector axis, between a retracted position and a deployed position. A method of establishing fluidic communication between two conduits in an aircraft, including fitting two connectors at the end of the two conduits by such a device.

13 Claims, 9 Drawing Sheets

(58) Field of Classification Search
USPC .......................................................... 33/529
See application file for complete search history.

(56) References Cited

U.S. PATENT DOCUMENTS

| | | | | | |
|---|---|---|---|---|---|
| 3,140,534 | A | * | 7/1964 | Messina | F16L 1/00 |
| | | | | | 206/232 |
| 3,270,426 | A | * | 9/1966 | Rogge | G01B 3/00 |
| | | | | | 33/203.2 |
| 3,667,128 | A | * | 6/1972 | Morgan | F16L 1/20 |
| | | | | | 269/37 |
| 3,797,094 | A | * | 3/1974 | Combs | B21D 39/04 |
| | | | | | 29/237 |
| 4,120,095 | A | * | 10/1978 | Lebourg | F16L 1/26 |
| | | | | | 29/404 |
| 4,662,055 | A | * | 5/1987 | VanMeter | B25B 27/16 |
| | | | | | 29/271 |
| 8,220,174 | B1 | * | 7/2012 | Shwaiheen | G01B 5/25 |
| | | | | | 33/529 |
| 9,021,713 | B1 | * | 5/2015 | Pierson | G01B 3/563 |
| | | | | | 33/462 |
| 2002/0170189 | A1 | * | 11/2002 | Cheatham | E04F 21/0015 |
| | | | | | 33/194 |
| 2011/0219633 | A1 | * | 9/2011 | Hanna | G01B 11/27 |
| | | | | | 33/286 |
| 2015/0345682 | A1 | * | 12/2015 | Fraysse | F16L 37/086 |
| | | | | | 285/418 |

FOREIGN PATENT DOCUMENTS

| | | |
|---|---|---|
| FR | 1 117 309 | 5/1956 |
| FR | 1 307 991 | 9/1962 |
| FR | 2 841 167 | 12/2003 |

OTHER PUBLICATIONS

French Search Report for Application No. 12 55 079 dated Mar. 14, 2013.
English Translation of the Written Opinion for Application No. PCT/FR2013/051234 dated Dec. 20, 2013.

* cited by examiner

DEVICE AND METHOD FOR FITTING TWO CONNECTIONS AT THE END OF TWO CONDUITS, IN PARTICULAR IN AN AIRCRAFT

CROSS-REFERENCE TO RELATED APPLICATIONS

This application is a continuation of and claims priority to PCT Patent Application No. PCT/FR2013/051234 filed May 31, 2013, which claims the benefit of and priority to French Patent Application No. 12 55079 filed Jun. 1, 2012, the entire disclosures of which are incorporated by reference herein.

TECHNICAL FIELD

The present disclosure relates generally to providing fluidic communication between two conduits by a connecting pipe the opposite ends of which are respectively intended to be fixed to the ends of two connectors fitted into the aforementioned two conduits. The disclosure more particularly relates to a device and a method for fitting two connectors at the ends of the two conduits with a view to subsequent mutual connection of these two pipes by the connecting pipe. The disclosure may be applied to any type of conduit, but is more particularly intended for fuel pipes in aircraft.

BACKGROUND

Aircraft generally include networks of pipes for feeding fuel from the fuel tanks, which are usually housed in the fuselage and/or in the wings, to the engines.

FIG. 1 represents by way of example the interior of an aircraft fuselage, and more particularly shows a tank wall 10 delimiting a fuel tank and a floor 12.

There is seen in this figure part of a network 14 of fuel feed pipes. Certain pipes 16a, 16b of this network 14 are provided with a connector 18 fitted into an end of the pipe and including a flange 20 to which is fixed one end of a connecting pipe 22 the other end of which is fixed in an analogous manner to another connector 18 fitted into another pipe 16b, 16a. In the typical example shown in FIG. 1, certain pipes 16a of the aforementioned pipes are mounted through the tank wall 10 and form fuel outlet couplings through this tank wall. As FIG. 1 shows, the connecting pipes 22 are generally straight pipes.

This method of assembling pipes, or more generally conduits, by connectors fitted to them, is also encountered with the pipes housed in the wings of aircraft, some of which are mounted through ribs of the wings.

As a general rule, the mounting of each connector by fitting it into the corresponding conduit or pipe is usually carried out by hand, the operator taking care to achieve a satisfactory direction of the axis of the connector. In the usual case of employing a straight connecting pipe, the axis of the connector must therefore be aligned with the axis of another pipe to which the aforementioned connector is intended to be connected by the connecting pipe. It is to be noted that this other pipe may if appropriate already be equipped with its own connector. In the present description, the axis of a conduit, notably of a pipe, is defined as being the axis of the outlet section concerned of the conduit.

FIG. 2 shows a mounting operation entailing force-fitting a connector 18 into a pipe 16a passing through the tank wall 10 from FIG. 1.

During such an operation of mounting the connector, there exists a risk of the connector passing through a position in which the axis 24 of the connector departs from its nominal direction 26, which corresponds to the axis of the pipe 16a, by an angle θ greater than the maximum permitted angle of relative movement for the connector, in which case the latter runs the risk of being damaged. The risk of damage is particularly marked when the connector includes a seal on its exterior surface.

SUMMARY

An object of the disclosure is to provide a simple, economical and effective solution to this problem, and in particular to simplify and improve the reliability of the operations for mounting connectors in the networks of conduits and pipes, notably those intended for the circulation of fuel in aircraft.

To this end the disclosure provides a method of fitting two connectors to the end of two respective conduits, particularly in an aircraft, in a manner enabling subsequent mutual connection of the connectors by a connecting pipe, the method comprising:

procuring a device including:
  a body;
  a first connector support mounted on a first end part of the body and including temporary connector retainers that define an associated connector axis;
  a second connector support connected to a second end part of the body opposite the first end part thereof and including a temporary connector retainers that define an associated connector axis;
  structure for moving the first connector support in translation relative to the body of the device, parallel to the connector axis associated with the first connector support, between a retracted position and a deployed position;
fixing the two connectors to the respective two connector supports of the device, by the corresponding temporary connector retainers;
positioning the device equipped with the connectors so as to dispose each of these connectors opposite the corresponding conduit so that each corresponding connector axis is aligned with an axis of the corresponding conduit;
moving the first connector support relative to the body of the device, as far as its deployed position, leading to fitting each connector into the corresponding conduit;
disengaging the temporary retainer from each connector support so as to release each of the two connectors.

The method in accordance with the disclosure enables conjoint fitting of two connectors into two conduits to be connected subsequently by a connecting pipe connected to these two connectors.

The conduits concerned may take the form of pipes, such as pipes mounted through wing ribs or in aircraft fuselage walls, or outlet pipes of aircraft fuel tanks inside and/or outside such tanks. Without departing from the scope of the present disclosure, they may equally be conduits or channels formed within the thickness of walls.

Fitting the connectors to the end of the conduits as disclosed herein means either fitting connectors into the conduits or around them when these conduits take the form of pipes.

The second connector support may be produced in one piece with the body or mounted on the body, as will become more clearly apparent hereinafter.

Generally speaking, the device used enables the connectors to be guided when fitting them into the aforementioned conduits to guarantee correct orientation of the respective axes of the connectors. Thus the method in accordance with the disclosure makes it possible to simplify the mounting of the connectors in the conduits and to make it more reliable.

The connector axes respectively defined by the first and second connector supports can be mutually parallel.

In one embodiment of the disclosure, the connector axes respectively defined by the first and second connector supports coincide.

The method is therefore suitable for the conjoint mounting of two connectors at the end of two conduits with coincident axes, to be subsequently connected by a straight connecting pipe.

The temporary connector retainers of at least one of the connector supports can include mobile connector clamping members. In this case, the fixing of the corresponding connector to the connector support is effected by movement of the mobile connector clamping members.

At least one of the first and second connector supports in one aspect takes the form of a plate.

In this case, the temporary connector retainers of this plate are configured to enable the temporary retention of a connector on a distal face of the plate opposite the body.

The temporary connector retainers advantageously include at least one centering groove formed in the distal face of the plate and conformed to receive an end lip of a connector.

The aforementioned temporary connector retainers can include at least two mobile clamping members respectively mounted to slide in two diametrically opposite openings formed in the plate, these openings each extending in a direction having at least one radial component, and preferably, in the radial direction, relative to the connector axis associated with the plate.

Each of these clamping members advantageously includes a small plate arranged facing the distal face of the plate, a screw mounted in the small plate, extending through the corresponding opening in the plate, and including a clamp for clamping the small plate to the plate, the clamp taking for example the form of a nut mounted on the screw and bearing on a proximal face of the plate opposite the distal face.

Alternatively, the first and/or second connector supports of the device may be designed so that they can be inserted into a connector. In this case, the temporary connector retainers of this connector support can include clamping members movable radially and intended to exert a radially outward clamping pressure on the internal surface of a connector.

In one embodiment of the disclosure, the aforementioned two connector supports take the form of respective plates the temporary connector retainers of which are configured to enable the temporary retention of a connector on a distal face of the plate opposite the body.

Moreover, the structure for moving the first connector support relative to the body of the device can include structure for converting a movement of rotation of an actuator of the device about an axis of the body of the device into a relative movement in translation of the first connector support with respect to the aforementioned body.

In one embodiment of the disclosure, the structure for moving the first connector support includes:
- a nut rotatably mounted and fixed in translation on the first end part of the body of the device;
- a rod fastened to the first connector support and screwed into the nut;
- a cam follower fastened to a first element selected from the rod and the body of the device;
- a cam fastened to the other element selected from the rod and the body of the device and configured to enable guiding of the cam follower in translation parallel to the corresponding connector axis.

In this case the movement of the first connector support relative to the body of the device is effected by a movement in rotation of the nut relative to the body.

The structure for moving the first connector support therefore forms a nut-and-bolt type mechanism enabling a movement in rotation of the nut to be converted into a movement in longitudinal translation of the first connector support. The actuation of this type of movement requires little force on the part of a user and offers high manoeuvring accuracy, and so the device used is therefore particularly ergonomic.

Of course, the nut is advantageously designed to exhibit sufficient friction to prevent spontaneous movement of the first connector support.

The cam follower can project from the aforementioned rod.

This cam follower can consist of a lug, for example.

The cam can be fastened to the device body.

This cam is for example formed by the lateral edges of an opening in the body of the device extending parallel to the connector axis associated with the first connector support.

Alternatively, the cam may be formed by two ribs or by the lateral flanks of a groove on the interior surface of the body of the device.

The device can include structure for moving the second connector support in translation relative to the body of the device, parallel to the corresponding connector axis, and a lock for locking the position of this second connector support relative to the body.

In this case, the method includes a preliminary step of adjusting the length of the device, including:
- moving the second connector support of the device in translation relative to the body of this device, parallel to the connector axis associated with the second connector support; then
- activating the lock for locking the position of the second connector support relative to the body.

Thus the method enables adjustment of the overall length of the device as a function of the distance between the two conduits to the ends of which the two connectors are respectively to be fitted.

The structure for moving the second connector support in translation can include a tube fastened to this second connector support and in which the body of the device is slidably mounted, the lock being designed in this case to lock the position of this tube relative to the body.

In this case, the movement of the second connector support is produced by a sliding movement of the body of the device in or on the tube fastened to the second connector support.

Alternatively, the tube fastened to the second connector support may be slidably mounted in the body of the device.

The aforementioned lock can define a discrete series of positions of the tube relative to the body of the device, corresponding to a series of standardized conduit spacings.

The lock advantageously includes a quick-clamp lever employing an eccentric cam.

The temporary connector retainers of at least one of the connector supports can be adapted to center relative to the corresponding connector axis connectors of at least two types differing in their respective different inside diameters.

The method can therefore be used for connectors of different diameters, using one and the same device.

In one embodiment of the disclosure, these temporary connector retainers, which are adapted to center connectors of at least two types, include a plurality of concentric grooves formed in the distal face of the corresponding plate.

The disclosure also concerns a method of establishing fluidic communication between two conduits in an aircraft, including:
  fitting two connectors to the end of two respective conduits by a fitting method of the type described above;
  positioning a connecting pipe between the two connectors in alignment therewith;
  fixing opposite ends of the connecting pipe to the respective two connectors.

This latter step can include respectively fixing two end flanges of the connecting pipe to two respective end flanges of the two connectors.

The disclosure also concerns a device for implementing a method of the type described above.

The device includes, in accordance with the disclosure:
  a body;
  a first connector support mounted on a first end part of the body and including temporary connector retainers that define an associated connector axis;
  a second connector support connected to a second end part of the body opposite the first end part thereof and including temporary connector retainers that define an associated connector axis;
  structure for moving the first connector support in translation relative to the body of the device, parallel to the corresponding connector axis, between a retracted position and a deployed position.

As explained above, this device enables conjoint mounting of two connectors to be connected by a connecting pipe and enables guiding and centering of these connectors as they are fitted to the ends of the aforementioned two conduits.

The device therefore makes it possible to simplify the mounting of such connectors and make it more reliable.

The temporary connector retainers of at least one of the connector supports can include mobile connector clamping members.

Other optional features of this device have been described above with reference to the method in accordance with the disclosure.

BRIEF DESCRIPTION OF THE DRAWINGS

The disclosure will be better understood, and other details, advantages and features thereof will become apparent, on reading the following description given by way of nonlimiting example with reference to the appended drawings, in which.

In all of these figures, identical references may designate identical or analogous elements.

DETAILED DESCRIPTION

Figure 3:
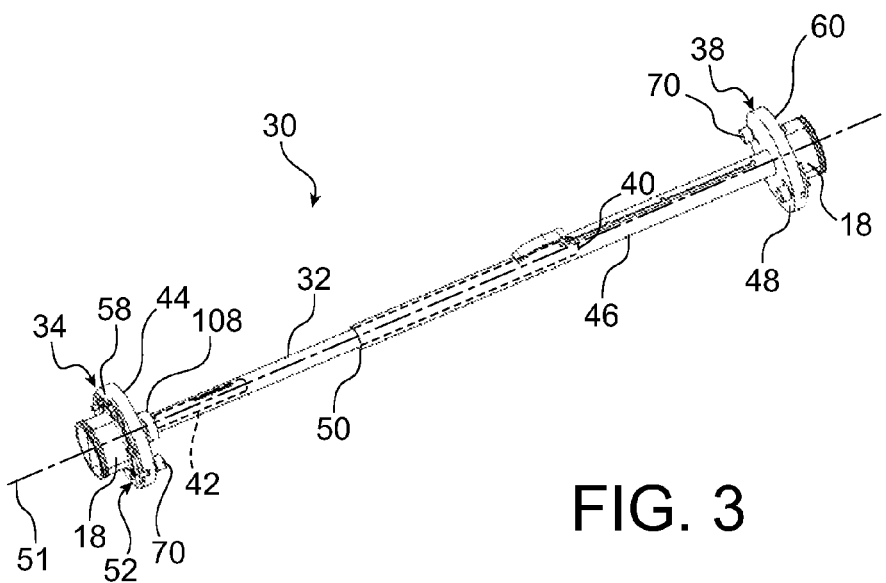
FIG. 3 is a diagrammatic perspective view of a device in accordance with one embodiment of the disclosure, on which two connectors are mounted.
Figure 4:
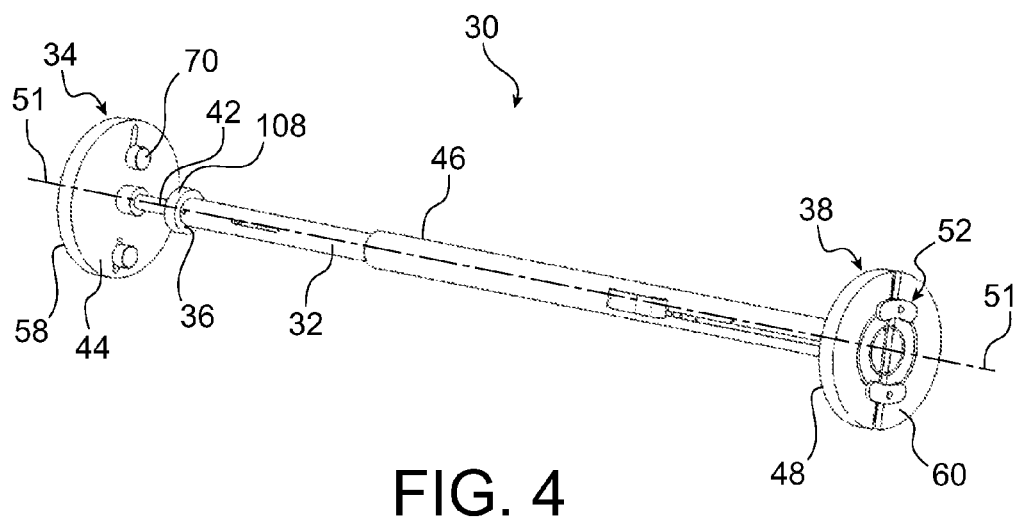
FIG. 4 is a diagrammatic perspective view of the device from FIG. 3, shown without any connectors.

FIGS. 3 and 4 are general views of a device 30 in accordance with one embodiment of the disclosure, intended to serve as a mounting tool for fitting two connectors at the end of two conduits or pipes with a view to subsequent mutual connection of these connectors by a connecting pipe.

The device 30 comprises a tubular body 32, a first plate 34 mounted at a first end 36 (FIG. 4) of the body 32, and a second plate 38 mounted at a second end 40 (FIG. 3) of the body 32 opposite the first end 36.

The first and second plates 34 and 36 form first and second connector supports, respectively, to use the terminology of the present disclosure.

The first plate 34 has the general shape of a disk and is fastened to a rod 42 projecting from a proximal face 44 of this plate perpendicularly to this face 44. The rod 42 is slidably mounted in the first end 36 of the body 32 by a nut-and-bolt type mechanism that will be described later. The rod 42 and the nut-and-bolt type mechanism form structure for moving the first plate 34 relative to the body 32, as will become more clearly apparent hereinafter.

The second plate 38 also has the general shape of a disk and is fastened to a tube 46 projecting from a proximal face 48 of this plate perpendicularly to this face 48. The second end 40 of the body 32 is slidably mounted in the free end 50 of the tube 46. The latter therefore forms structure for moving the second plate 38 in translation relative to the body 32. This body 32 includes near its second end 40 a lock for locking its position relative to the tube 46, described in detail hereinafter.

In the embodiment shown, the two plates 34 and 38 are centered relative to a common axis that may be defined as being the axis 51 of the tubular body 32. This axis 51 therefore constitutes the axis of each plate 34, 38.

Each plate 34, 38 includes retention structures 52 for temporary retention on the distal face 58, 60 of this plate of a connector 18 (FIG. 3). The retention structures are designed to enable centering of connectors 18 on each plate and therefore define respective connector axes of these plates, as will become more clearly apparent hereinafter. In the embodiment shown, these connector axes coincide with the axis 51 of the body 32 of the device.

It is to be noted that FIG. 3 shows the device with two connectors 18 mounted on the plates 34, 38 thereof, while FIG. 4 shows the same device without any connectors.

Figure 5:
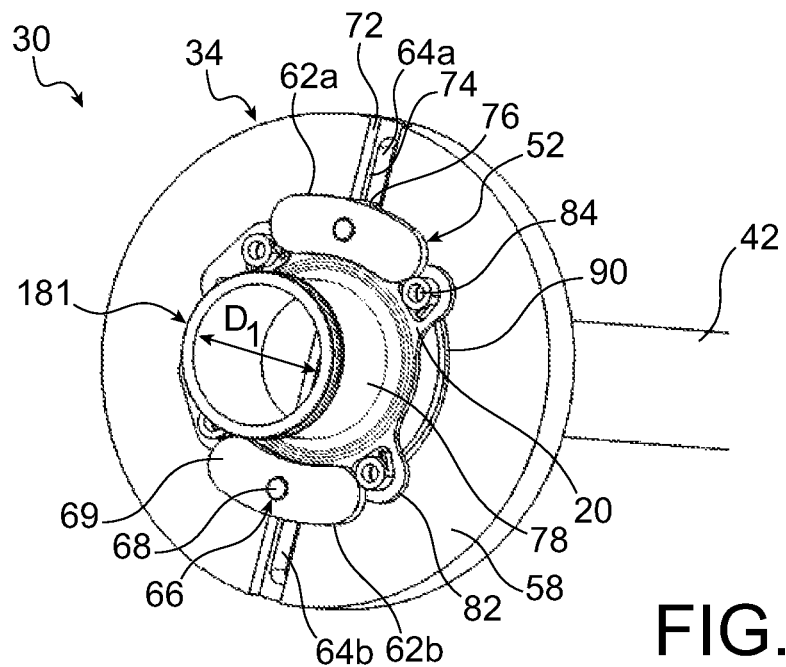
FIG. 5 is a diagrammatic partial view to a larger scale of the device from FIG. 3, showing a connector with a first diameter mounted on a plate of the device.
Figure 6:
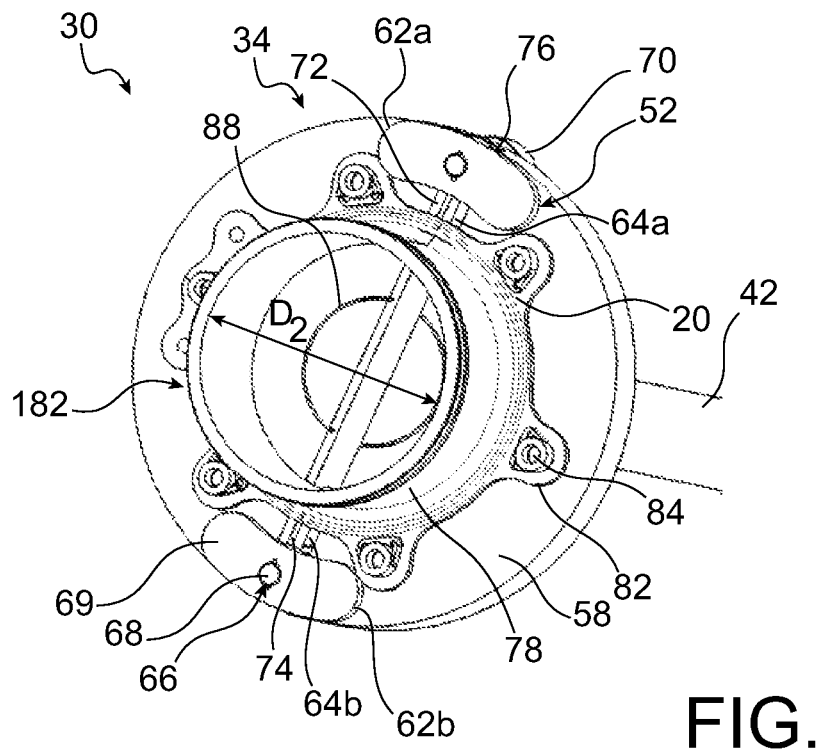
FIG. 6 is a view similar to FIG. 5, showing a connector with a second diameter mounted on the plate represented in FIG. 5.
Figure 7:
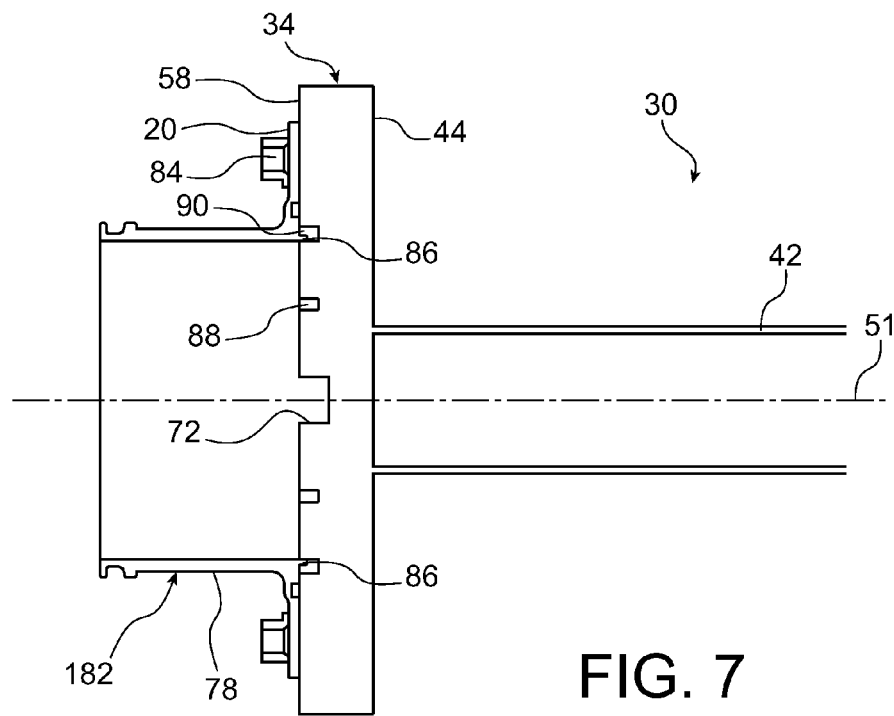
FIG. 7 is a diagrammatic partial view in longitudinal section of the device from FIG. 3, showing the plate and the connector from FIG. 6.

FIGS. 5 to 7 show in more detail the retention structures 52 for temporary retention of connectors on the first plate 34, which are similar to those that equip the second plate 38.

The retention structures 52 include two opposite jaws 62a and 62b slidably mounted in two radial openings 64a, 64b in the plate 34. Each jaw 62a, 62b takes the form of a small plate pressed against the distal face 58 of the plate and including an orifice through which passes a screw 66 the head 68 of which is pressed against the distal face 69 of the jaw and that passes through the corresponding opening 64a, 64b. Each jaw 62a, 62b further includes a retaining nut 70 screwed onto the end of the screw 66 on the other side of the plate 34, which nut 70 can be seen in FIGS. 3 and 4, as well as in FIG. 9 to be described hereinafter.

Each of the two jaws 62a, 62b forms a "mobile connector clamping member" to use the terminology specific to the disclosure.

As FIGS. 5 and 6 show, the distal face 58 of the plate 34 includes a diametral groove 72 which has a rectangular cross section, for example. The depth of this groove 72 is for example substantially equal to half the thickness of the plate 34.

Moreover, the radial openings 64a and 64b are formed in the bottom of the groove 72, on either side of the center of the plate 34. The width of each opening 64a, 64b is less than the width of the groove 72, so that the bottom of the groove 72 forms a shoulder 74 on each side of the openings 64a and 64b.

Each jaw 62a, 62b includes a centering pin 76 having a parallelepiped section complementary to the cross section of the groove 72 and projecting from the proximal face of the jaw in a middle region of that jaw. The pin 76 has a circumference shorter than that of the jaw so that a portion of the flange 20 of a connector can be gripped between lateral parts of the jaw and the plate, as shown in FIG. 5, to guarantee retention of the connector on the plate. In the example shown, it is in particular the edges of two fixing lugs 82 projecting radially outward from the flange 20 that are gripped between each jaw 62a, 62b and the plate 34.

As FIGS. 5 and 6 show, each jaw 62a, 62b is able to slide along the corresponding opening 64a, 64b if the nut 70 of the jaw is sufficiently loosened. During such movement, the centering pin 76 of the jaw is guided in the groove 72 of complementary section and therefore centers the jaw relative to the groove.

In the example shown, each opening 64a, 64b defines two mutually spaced positions of the corresponding jaw 62a, 62b, enabling the retention of respective connectors with two different diameters, which are shown in FIGS. 5 and 6, respectively. FIG. 5 shows a connector 181 of smaller inside diameter D1, for example equal to 2 inches (5.08 cm), substantially corresponding to a radially internal position of the jaws 62a and 62b, while FIG. 6 shows a connector 182 of larger inside diameter D2, for example equal to 3.5 inches (8.89 cm), corresponding to a radially external position of the jaws 62a and 62b.

In a manner known in itself, each of the aforementioned connectors 181 and 182 includes a tubular portion 78 having at one of its ends the radial flange 20 provided with the fixing lugs 82 that are distributed around the axis of the connector, each of these lugs being provided with an orifice 84 for a fixing screw to pass through. Moreover, as is apparent in FIG. 7, each connector 181, 182 includes an annular lip 86 projecting longitudinally at the radially internal edge of the radial flange 20.

In one embodiment of the disclosure, the annular lip 86 of the connectors 181, 182 is used to center these connectors on the plates 34 and 38 of the device. To this end, each plate includes two coaxial annular centering grooves 88, 90 (FIGS. 5 to 7) on the respective distal face 58, 60 of the plate and centered relative to the axis 51 of this plate (not represented in FIGS. 5 and 6). The inside diameters of these two centering grooves 88, 90 are slightly less than the inside diameters D1 and D2, respectively, of the connectors 181, 182 to enable engagement of the annular lip 86 of each of the connectors in the corresponding centering groove 88, 90, as shown in FIG. 7 in the case of the larger diameter connector 182.

To use the terminology specific to the disclosure, the centering grooves 88 and 90 form part of the temporary connector retainers and participate in the definition of the connector axes 51.

Figure 8:
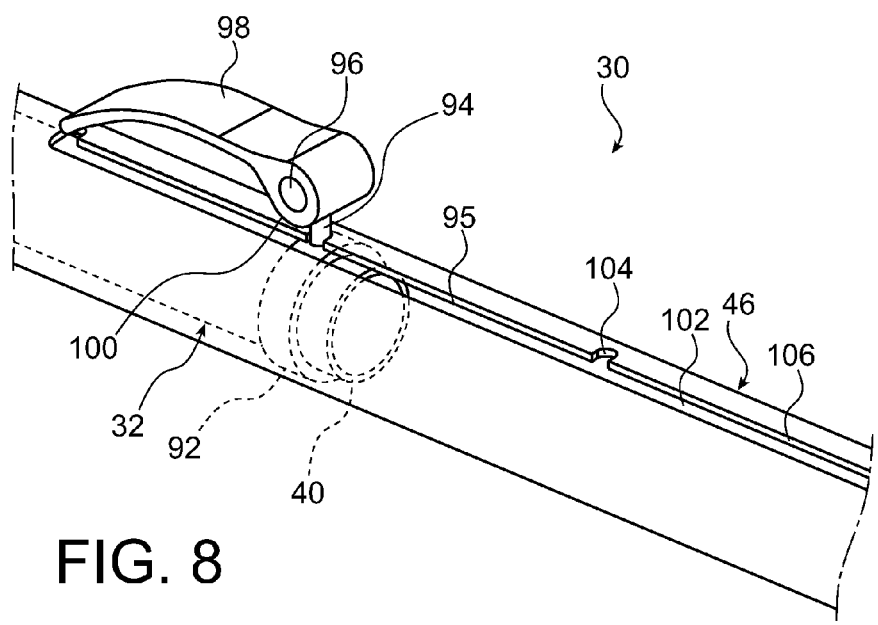
FIG. 8 is a diagrammatic partial perspective view of the device from FIG. 3, showing a body of the device slidably mounted in a tube fastened to a second plate of the device, as well as a lock for locking the position of the tube relative to the body.

FIG. 8 shows to a larger scale lock structure for locking the relative position of the body 32 of the device with respect to the tube 46 fastened to the second plate 38.

The lock structure includes a circular cylindrical bearing surface 92 projecting from the tubular body 32 of the device in the vicinity of the second end 40 of that body. The structure also includes a threaded rod 94 passing through an opening 95 in the tube 46. This rod 94 has one end screwed into the ring 92 and carries at its other end a spindle 96 orthogonal to the rod 94. The lock structure finally includes a lever 98 mounted to rotate about the spindle 96 and having an eccentric cam 100 about the spindle 96.

The assembly formed by the threaded rod 94 and the lever 98 forms a quick-clamp lever the operating principle of which is well known. When the lever 98 is in a raised loosened position, the eccentric cam 100 is not in contact with the tube 46 and so the body 32 is able to move freely in the tube 46. On the other hand, when the lever 98 is sufficiently screwed onto the threaded rod 94 and the lever is lowered into a clamping position, the eccentric cam 100 exerts pressure on the tube 46 tending to block movement of the bearing surface 92 and therefore of the body 32 in the tube 46. For reasons of clarity, FIG. 8 shows the lever 98 in a lowered position but insufficiently screwed onto the rod 94 so that the eccentric cam 100 is not in contact with the tube 46.

The opening 95 in the tube 46 takes the form of a longitudinal slot 102 and a plurality of notches 104 at regular intervals in one of the longitudinal edges 106 of the slot 102. These notches 104 define a discrete series of positions of the body 32 relative to the tube 46, corresponding to a discrete series of lengths of the device. When the rod 94 is moved into one of the notches 104, as shown in FIG. 8, and when the lever 98 is then lowered into the clamping position, the pressure exerted by the eccentric cam 100 prevents rotation of the body 32 relative to the tube 46 and therefore prevents disengagement of the rod 94 from the notch 104.

Figure 9:
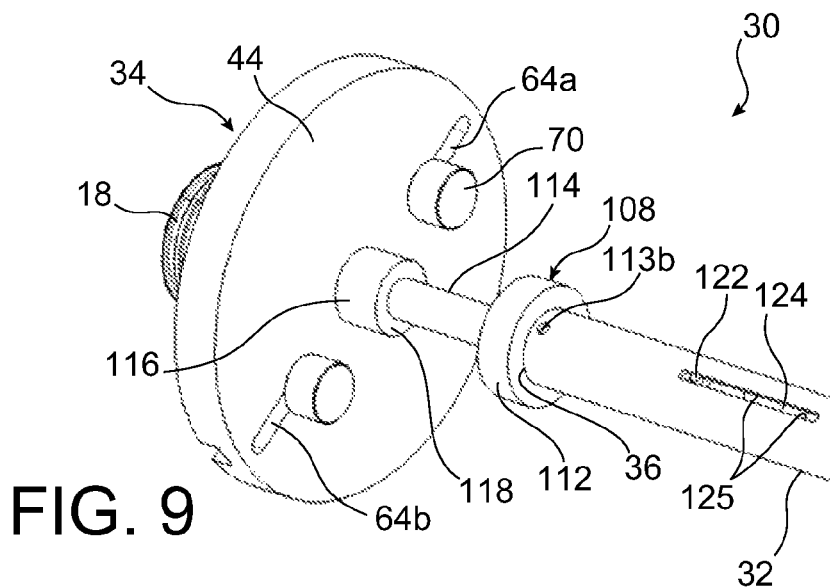
FIG. 9 is a diagrammatic partial perspective view of the device from FIG. 3, showing structure for moving the first plate relative to the body of the device.
Figure 10:
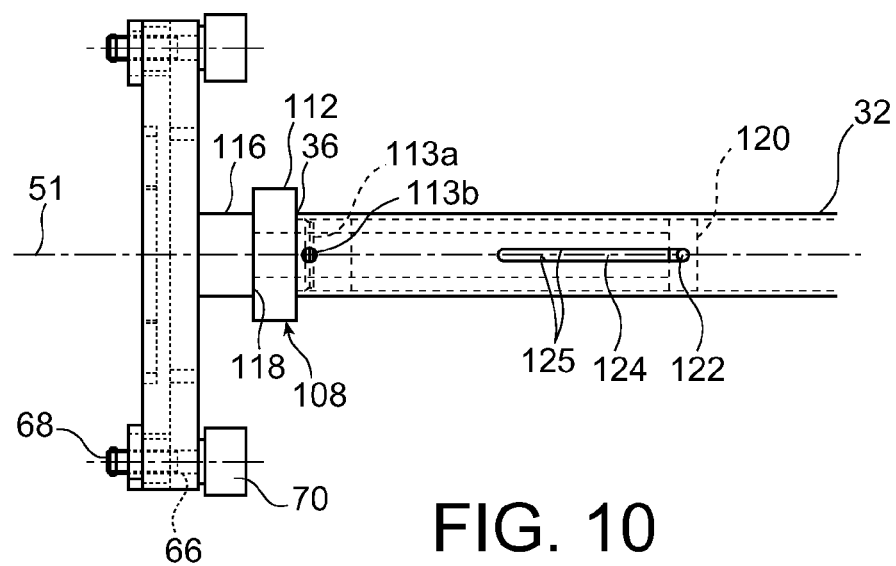
FIG. 10 is a diagrammatic partial top view of the elements represented in FIG. 8.
Figure 11:
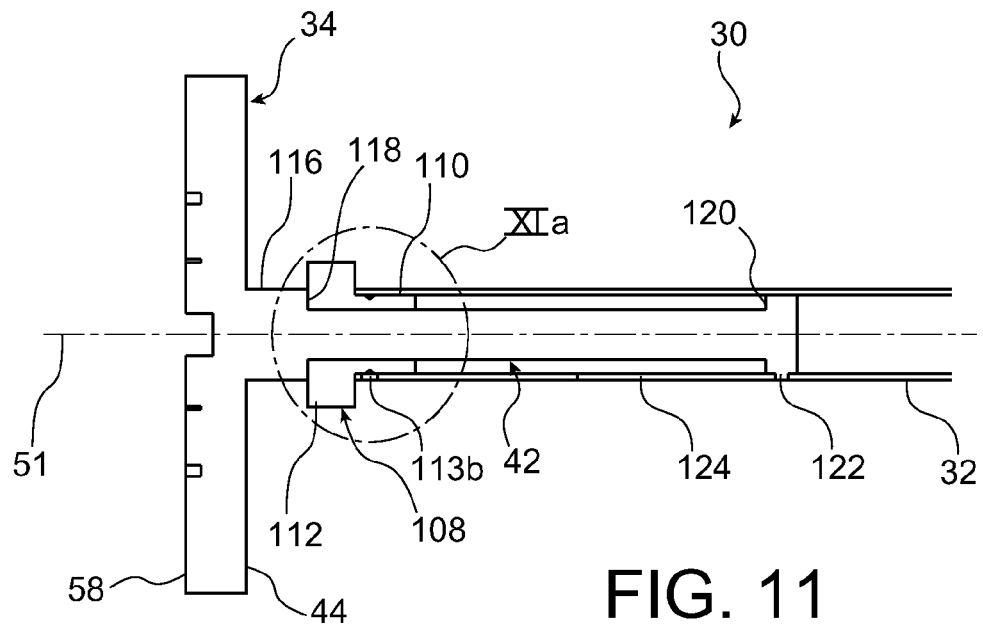
FIG. 11 is a diagrammatic partial view in longitudinal section of the elements represented in FIG. 8.

FIGS. 9 to 11 show the structure for moving the first plate 34 relative to the body 32 of the device.

Figure 11A:
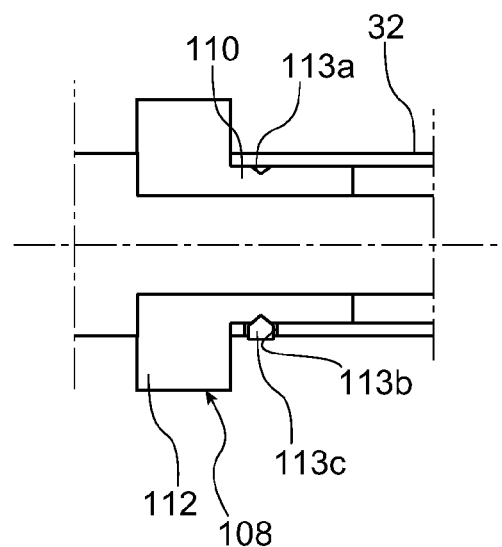
FIG. 11a is a view to a larger scale of the detail XIa from FIG. 11.

The movement structure includes a nut 108 including a tubular part 110 rotatably mounted in the first end 36 of the body 32 (FIG. 11) and a holding ring 112 projecting at the end of the tubular part 110 on the same side as the first plate 34. The holding ring is outside the body 32 of the device. The tubular part 110 of the nut 108 is free to rotate but prevented from moving in translation relative to the body 32. To this end, as is more clearly apparent in FIG. 11a, this tubular part 110 has a V-section groove 113a, for example, and the body 32 includes a threaded orifice through which passes a grubscrew 113b the tip of which bears on the bottom of the groove 113a so that this grubscrew 113b forms a stop opposing movement in translation of the nut 108.

The movement structure also includes the rod 42 extending from the proximal face 44 of the first plate 34. This rod 42 includes a threaded portion 114 onto which the nut 108 is screwed, a first end ring 116 connected to the plate 34 and forming a shoulder 118 at the level of the connection of this ring 116 to the threaded portion 114, and an annular end head 120 at the free end of the rod 42 and carrying a lug 122 forming a cam follower. The head 120 of the rod 42 is slidably mounted in the body 32.

The movement structure further includes a longitudinal opening 124 in the tubular body 32 through which the lug 122 passes. The edges 125 of this opening form a cam for guiding the lug 122 in translation parallel to the axis 51 of the body 32.

The movement structure described above therefore forms a nut-and-bolt type mechanism: when a user of the device actuates rotation of the nut 108, the rod 42, prevented from rotating by the lug 122 guided in the opening 124, moves in translation parallel to the axis 51 relative to the body 32 and entrains the first plate 34 with it between a retracted position and a deployed position.

Figure 1:
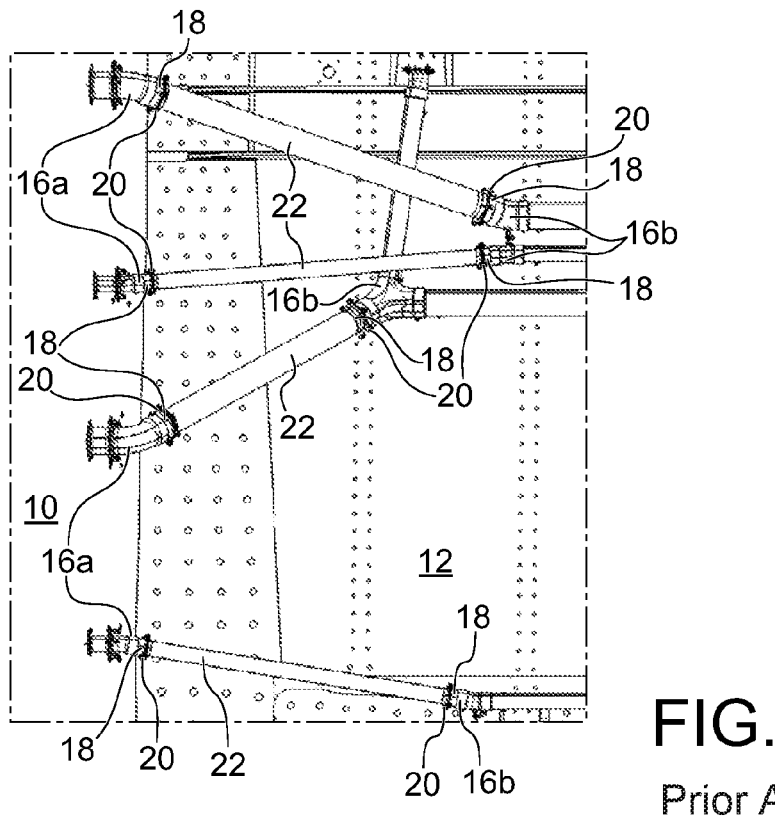
FIG. 1, already described, is a diagrammatic partial perspective view of the interior of an aircraft fuselage, showing a fuel circulation network.
Figure 2:
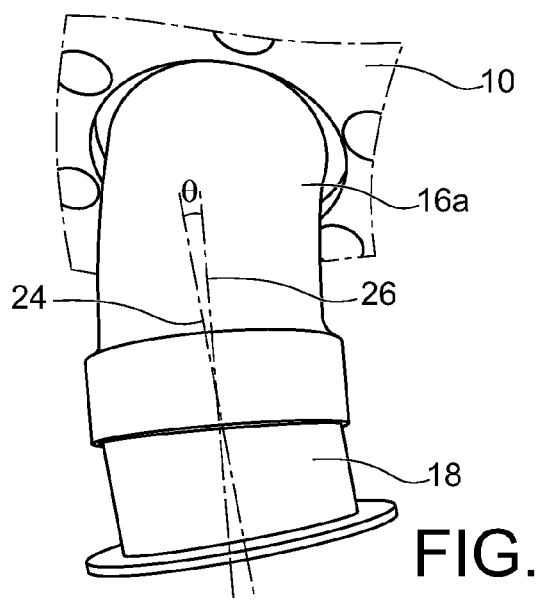
FIG. 2, already described, is a diagrammatic partial perspective view to a larger scale of the interior of the fuselage from FIG. 1, showing the mounting of a connector on a pipe of the network, by a method of a known type.

The device described above can be used to implement a method of establishing fluidic communication between two conduits in an aircraft, these conduits being fuel pipes 16a, 16b housed in the aircraft fuselage from FIG. 1, for example.

Figure 12:
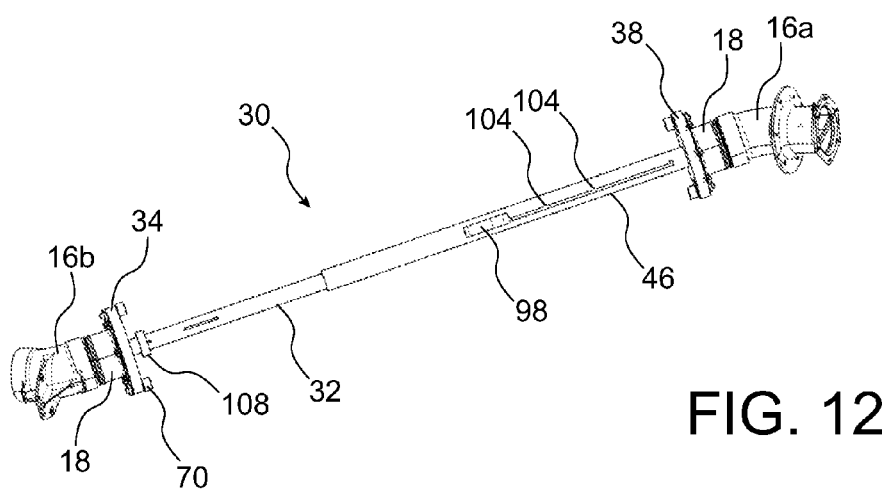
FIG. 12 is a diagrammatic partial perspective view of the interior of the fuselage from FIG. 1, showing the positioning of two connectors respectively facing two pipes, by the device from FIGS. 3 to 11.
Figure 13:
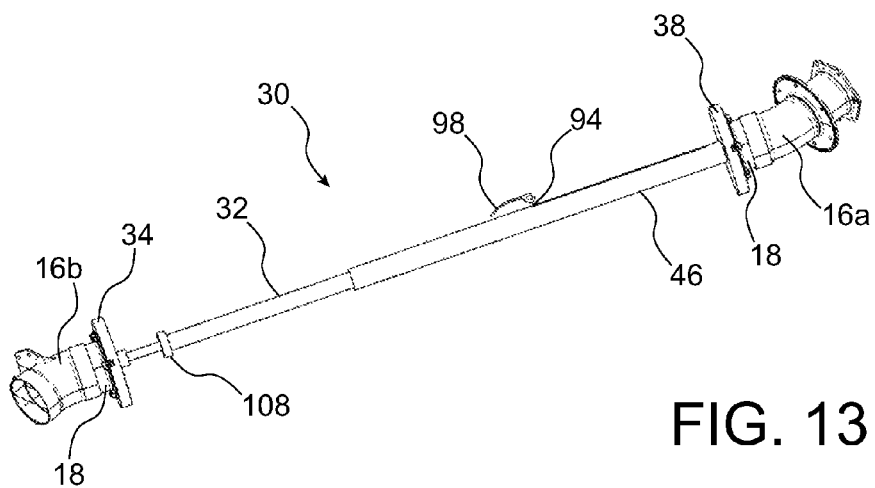
FIG. 13 is a view similar to FIG. 12, showing a subsequent operation of fitting the two connectors into the respective two pipes.
Figure 14:
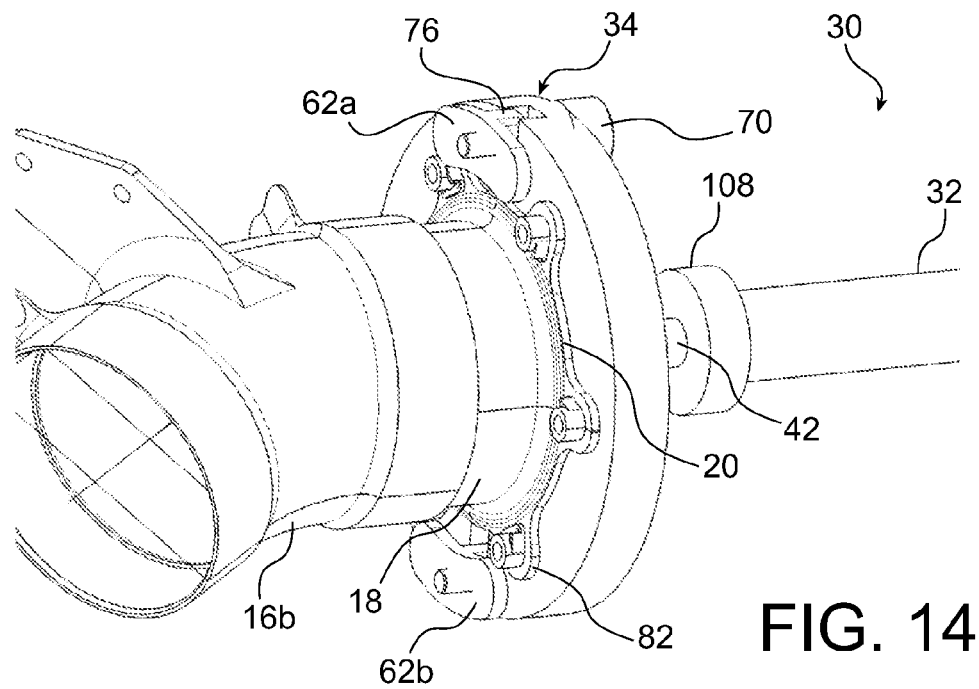
FIG. 14 is a view to a larger scale showing a subsequent operation of disengaging temporary retainer from the connector mounted on the first plate of the device.
Figure 15:
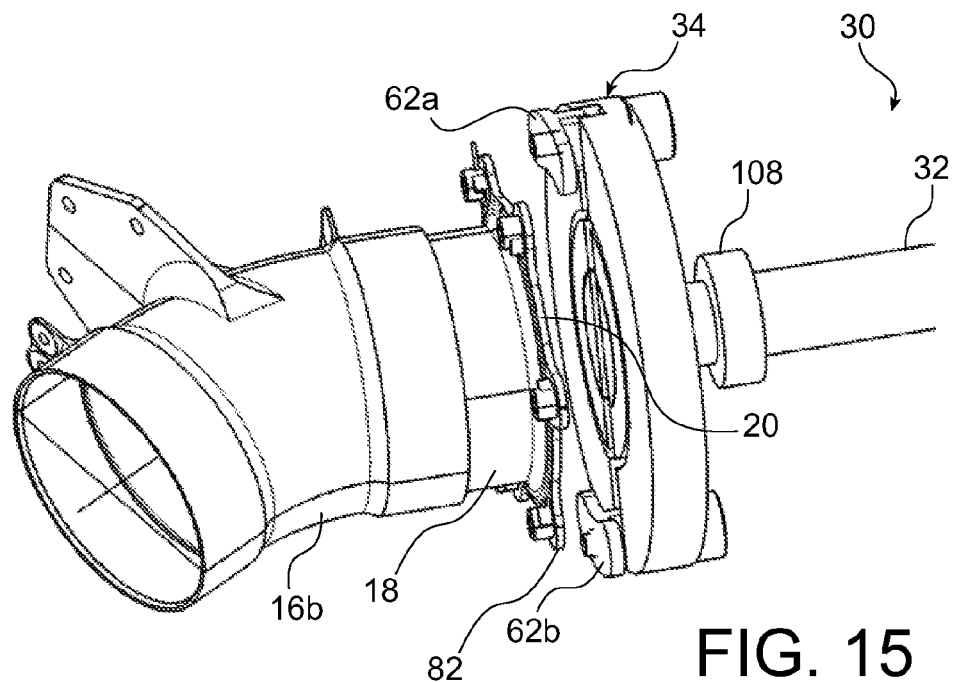
FIG. 15 is a view similar to FIG. 14 showing a subsequent operation of retracting the first plate.
Figure 16:
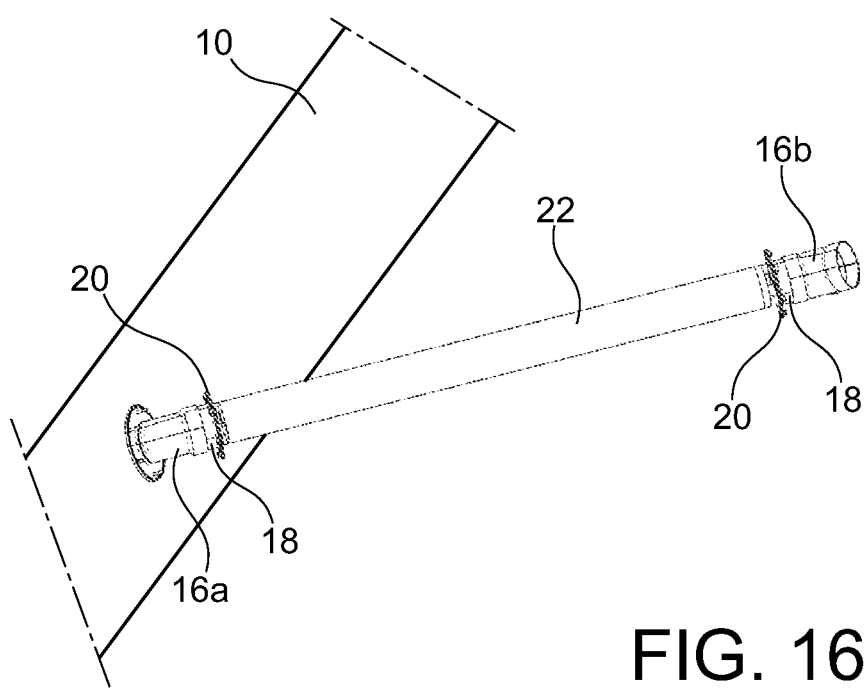
FIG. 16 shows the subsequent connection of the two pipes from FIG. 12 by a connecting pipe.

Such a method includes in succession:
procuring a device 30 of the type described above;
if necessary, raising the lever 98 to the loosened position;
sliding the body 32 of the device in the tube 46 fastened to the second plate 38 of the device, followed by engaging the threaded rod 94 carrying the lever 98 in one of the notches 104 so as to impart to the device 30 a length suited to the gap between the aforementioned two pipes 16a and 16b;
where applicable, screwing the threaded rod 94, followed by lowering of the lever 98 into the clamping position;
fixing the two connectors 18 to the respective two plates 34, 38 of the device, inserting the annular lip 86 of each connector in the appropriate centering groove 88, 90 of the corresponding plate, then moving the two jaws 62a, 62b of each plate radially inward until each jaw covers part of the flange 20 of the corresponding connector, and finally tightening the retaining nuts 70 of each of the jaws;
positioning the device 30 equipped with the connectors 18 so as to place each of these connectors opposite the corresponding pipe 16a, 16b, as shown in FIG. 12;
actuating rotation of the nut 108 mounted in the first end 36 of the body 32 of the device so as to move the first plate 34 relative to this body 32 as far as its deployed position, leading to the fitting of each connector into the corresponding pipe 16a, 16b, as shown in FIG. 13;
releasing each of the two connectors 18 by loosening the retaining nuts 70 of the jaws 62a, 62b and then moving the latter radially outward, as shown in FIG. 14;
actuating the nut 108 in the reverse direction so as to move the first plate 34 to its retracted position relative to the body 32, as shown in FIG. 15;
removing the device 30 from the area between the two pipes 16a and 16b;
placing a connecting pipe 22 between the two connectors 18 and in alignment therewith; then
fixing two end flanges of the connecting pipe 22 to the respective flanges 20 of the two connectors 18, as shown in FIG. 16.

As explained above, this method enables simple and reliable mounting of the connectors 18 in the pipes 16a, 16b, making it possible to reduce considerably the risks of damaging the connectors.

While at least one exemplary embodiment of the present disclosure has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The invention claimed is:

1. A method of fitting two connectors to the end of two respective conduits in an aircraft, in a manner enabling subsequent mutual connection of the connectors by a connecting pipe, wherein the method includes:
   providing a device including:
      a body;
      a first connector support mounted on a first end part of the body and including temporary connector retainers that define a first connector axis;
      a second connector support connected to a second end part of the body opposite the first end part thereof and including temporary connector retainers that define a second connector axis; and
      structure for moving the first connector support in translation relative to the body of the device, parallel to the first connector axis, between a retracted position and a deployed position,
      wherein the first and second connector axes coincide;
   fixing the two connectors to the respective two connector supports of the device, by the corresponding temporary connector retainers;
   positioning the device equipped with the connectors so as to dispose each of the connectors onto the corresponding conduit so that each corresponding connector axis is aligned with an axis of the corresponding conduit;

moving the first connector support relative to the body of the device, as far as its deployed position;

fitting each connector into the corresponding conduit; and disengaging the temporary retainer from each connector support so as to release each of the two connectors.

2. The method according to claim 1, wherein the structure for moving the first connector support includes:

a nut rotatably mounted and fixed in translation on the first end part of the body of the device;

a rod fastened to the first connector support and screwed into the nut;

a cam follower fastened to a first element selected from the rod and the body of the device; and a cam fastened to the other element selected from the rod and the body of the device and configured to enable guiding of the cam follower in translation parallel to the first connector axis;

wherein movement of the first connector support relative to the body of the device is effected by a movement in rotation of the nut relative to the body.

3. The method according to claim 1, wherein the device further includes structure for moving the second connector support in translation relative to the body of the device, parallel to the second connector axis, and a lock for locking the position of this second connector support relative to the body, the method including a preliminary step of adjusting the length of the device including:

moving the second connector support of the device in translation relative to the body of this device, parallel to the second connector axis; then activating the lock for locking the position of the second connector support relative to the body.

4. The method according to claim 3, wherein:

the structure for moving the second connector support in translation relative to the body of the device includes a tube fastened to the second connector support and in or on which the body is slidably mounted, the lock being configured to lock the position of the tube relative to the body, and movement of the second connector support of the device is produced by a sliding movement of the body of the device in or on the tube fastened to the second connector support.

5. The method according to claim 1, wherein the temporary connector retainers of at least one of the connector supports include mobile connector clamping members, and wherein fixing of the corresponding connector to the at least one connector support is effected by movement of the mobile connector clamping members.

6. A method of establishing fluidic communication between two conduits in an aircraft, including:

fitting two connectors to an end of two respective conduits using a device comprising:

a body;

a first connector support mounted on a first end part of the body and including temporary connector retainers that define a first connector axis;

a second connector support connected to a second end part of the body opposite the first end part thereof and including temporary connector retainers that define a second connector axis; and structure for moving the first connector support in translation relative to the body of the device, parallel to the first connector axis, between a retracted position and a deployed position, wherein the first and second connector axes coincide;

fixing the two connectors to the respective two connector supports of the device, by the corresponding temporary connector retainers;

positioning the device equipped with the connectors so as to dispose each of the connectors onto the corresponding conduit so that each corresponding connector axis is aligned with an axis of the corresponding conduit;

moving the first connector support relative to the body of the device, as far as its deployed position;

fitting each connector into the corresponding conduit;

disengaging the temporary retainer from each connector support so as to release each of the two connectors;

positioning a connecting pipe between the two connectors in alignment therewith; and fixing opposite ends of the connecting pipe to the respective two connectors.

7. A device for fitting two connectors to the end of two respective conduits in an aircraft, in a manner enabling subsequent mutual connection of the connectors by a connecting pipe, comprising:

a body;

a first connector support mounted on a first end part of the body and including temporary connector retainers that define a first connector axis and that include mobile connector clamping members;

a second connector support connected to a second end part of the body opposite the first end part thereof and including temporary connector retainers that define a second connector axis and that include mobile connector clamping members; and structure for moving the first connector support in translation relative to the body of the device, parallel to the first connector axis, between a retracted position and a deployed position, wherein the first and second connector axes coincide.

8. The device according to claim 7, wherein at least one of the first and second connector supports takes the form of a plate.

9. The device according to claim 8, wherein the mobile connector clamping members of the at least one connector support are slidably mounted in two respective diametrically opposite openings in the plate and each extending in a direction having at least one radial component relative to the corresponding connector axis.

10. The device according to claim 8, wherein temporary retainers of the plate include at least one centering groove formed in a distal face of the plate opposite the body and conformed to receive an end lip of a connector.

11. The device according to claim 7, further including structure for moving the second connector support in translation relative to the body of the device, parallel to the second connector axis, and a lock for locking the position of this second connector support relative to the body.

12. The device according to claim 11, wherein the structure for moving the second connector support in translation relative to the body of the device includes a tube fastened to the second connector support and in or on which the body is slidably mounted, the lock being configured to lock the position of the tube relative to the body.

13. The device according to claim 7, wherein the temporary connector retainers of at least one of the connector supports are adapted to center relative to the corresponding connector axis connectors of at least two types differing in their respective different inside diameters.

* * * * *